United States Patent [19]

Himes et al.

[11] Patent Number: 5,380,706

[45] Date of Patent: Jan. 10, 1995

[54] WELL DRILLING FLUIDS AND METHODS

[75] Inventors: Ronald E. Himes; Patty L. Totten; Edward E. Vinson, all of Duncan, Okla.

[73] Assignee: Halliburton Company, Duncan, Okla.

[21] Appl. No.: 38,582

[22] Filed: Mar. 26, 1993

Related U.S. Application Data

[63] Continuation-in-part of Ser. No. 804,252, Dec. 6, 1991, abandoned.

[51] Int. Cl.⁶ .............................................. C09K 7/02
[52] U.S. Cl. ................................................ 507/129
[58] Field of Search ....................................... 507/129

[56] References Cited

U.S. PATENT DOCUMENTS

| | | | |
|---|---|---|---|
| 2,861,042 | 11/1958 | Watkins | 507/129 |
| 2,930,755 | 3/1960 | Crittendon | 507/129 |
| 4,526,693 | 7/1985 | Son et al. | 252/8.5 B |
| 4,842,073 | 6/1989 | Himes et al. | 166/294 |
| 4,974,678 | 12/1990 | Himes et al. | 166/308 |
| 4,977,962 | 12/1990 | Himes et al. | 166/305.1 |
| 5,097,904 | 3/1992 | Himes et al. | |

*Primary Examiner*—Gary Geist
*Attorney, Agent, or Firm*—Robert A. Kent; Thomas R. Weaver

[57] ABSTRACT

Improved well drilling fluids and methods which prevent damage to water sensitive formations while drilling are provided. The drilling fluids include a formation stabilizing compound which contains an organic quaternary ammonium cation and an inorganic, organic or combination anion.

19 Claims, 1 Drawing Sheet

WELL DRILLING FLUIDS AND METHODS

This is a continuation-in-part of prior copending application Ser. No. 07/804,252 filed Dec. 6, 1991, now abandoned.

BACKGROUND OF THE INVENTION

1. Field of the Invention

The present invention relates to improved well drilling fluids and methods which prevent damage to water sensitive formations while drilling.

2. Description of the Prior Art

While drilling oil and gas wells into and through water sensitive subterranean formations, i.e., formations containing water swellable clays and other fines capable of migrating when disturbed, the contact of the clays and fines with an aqueous drilling fluid can cause damage to the formations. That is, the clays and fines are normally stable and do not present an obstruction to the flow of hydrocarbons through the subterranean formations containing them. However, when contacted with aqueous fluids which are foreign to the formations, the clays can swell and/or the fines can migrate in the formations causing losses in the permeabilities of the formations. Also, the swelling of clays can cause strength reductions in a subterranean formation which can result in the collapse of shale into the well bore.

Heretofore, it has been a common practice to include salts in aqueous drilling fluids to prevent or minimize damage resulting from the swelling of clays and migration of fines. The salts, such as potassium chloride, calcium chloride, ammonium chloride and the like, are typically dissolved in the aqueous fluid utilized in the drilling fluid. The salts effect an ion exchange with the charged particles comprising the clays and fines, and are often very effective in preventing swelling and/or migration.

In many areas where oil and gas wells are presently being drilled, the disposal of fluids having high salt or halide contents has been restricted to protect the environment. Such restrictions require that drilling fluids having high salt concentrations be disposed of in a special manner which is often expensive and difficult.

Thus, there is a need for improved aqueous drilling fluids and methods which prevent or minimize damage to water sensitive formations whereby salts, and particularly chloride containing salts, are minimized or not included in the drilling fluids.

SUMMARY OF THE INVENTION

The present invention provides improved aqueous drilling fluids and methods which overcome the shortcomings of the prior art and meet the need described above. The term "aqueous drilling fluid" as used in the following disclosure and in the appended claims, means a water-based fluid which does not contain oil as a part of the drilling fluid. Accordingly, the term "aqueous drilling fluid", as used herein does not include an oil-based drilling fluid or an emulsion drilling fluid such as a water-in-oil drilling fluid or an oil-in-water drilling fluid. Furthermore, an aqueous drilling fluid, as used herein, which is "comprised of" water together with named additives does not include oil as an ingredient of the drilling fluid. The improved drilling fluids of the present invention are comprised of water, at least one viscosifying agent and a formation stabilizing compound which functions to stabilize water sensitive formations containing clays and fines whereby swelling, migration and other damage is substantially prevented.

The formation stabilizing compound useful in accordance with the present invention is a compound containing a cation selected from the group consisting of N,N,N-trimethylphenylammonium, N-methylpyridinium, N,N-dimethylmorpholinium, the alkyl quaternary ammonium cation of the 2 mole oligomer of epihalohydrin wherein the alkyl radical is selected from—$CH_3$, —$C_2H_5$, —$C_3H_7$ and —$C_4H_9$ radicals, cations of the formula wherein R is independently selected from—$CH_3$, —$C_2H_5$, —$C_3H_7$, or —$C_4H_9$, and cations of the following general formulas:

wherein
A represents the group

B represents the group

C represents the group

D represents the group and
E represents and further wherein:
$R_1$ is selected from the groups,
—$CH_2COOH$, —$CH_2CH_2OH$,
—$CH_2CH_2CH_2OH$ and
—$CH_2CHOHCH_3$;

$R_2$ is selected from the groups,
—CHhd 2CH₂—, —$CH_2$CHOHCH₂—,
—CH₂CH₂CH₂—, —CH₂CH₂CH₂CH₂—, and
—CH₂CH₂OCH₂CH₂—;

$R_3$ is selected from the groups, and $R_4$ is independently hydrogen and the group —(CH₂)$_n$$_{CH3}$ wherein n has a value in the range of 0 to 5 and at least one of said $R_4$ substituents is said —(CH₂)$_n$CH₃ group.

The anion of the compound containing one of the cations described above is selected from the group consisting of halides, anions derived from organic acids, i.e., carboxylates, inorganic anions such as nitrate, nitrite, sulfate and sulfite, and other inorganic, organic or combination anions which do not adversely react with components in the drilling fluid or formations contacted thereby.

The formation stabilizing compound of this invention is more efficient than are the stabilizing salts heretofore utilized whereby a lower concentration of the formation stabilizing compound is required. Thus, when the formation stabilizing compound includes a halide anion, e.g., chloride, the overall halide content of the drilling fluid is lower than the halide content of drilling fluids utilized heretofore. In applications where it is desirable or a requirement that the halide content of the drilling fluid be eliminated completely, a non-halide anion can be utilized in the formation stabilizing compound.

It is, therefore, a general object of the present invention to provide improved aqueous well drilling fluids and methods which prevent damage to water sensitive formations while drilling.

A further object of the present invention is the provision of improved well drilling fluids which contain low halide content or no halide content whereby the drilling fluids can be conventionally disposed of.

Other and further objects, features and advantages of the present invention will be readily apparent to those skilled in the art upon a reading of the description of preferred embodiments which follows.

DESCRIPTION OF PREFERRED EMBODIMENTS

The present invention provides improved well drilling fluids containing a formation clay and fines stabilizing compound having an organic quaternary ammonium cation and an anion which can be a halide, an organic anion or other anion. When the formation stabilizing compound includes an anion comprised of a halide such as chloride, the overall halide content of the drilling fluid in which the compound is included is lower than heretofore used drilling fluids containing halide salts. Thus, where some halide content in the drilling fluid can be tolerated, the anion of the formation stabilizing compound can be a halide. In other applications, the halide content of the drilling fluid can be eliminated entirely by utilizing a formation stabilizing compound having a non-halide anion.

The improved aqueous well drilling fluids of the present invention are comprised of water, at least one viscosifying agent and a formation stabilizing compound containing a quaternary ammonium cation and a selected inorganic, organic or combination anion. The quaternary ammonium cation can be selected from the group consisting of N,N,N-trimethylphenylammonium, N-methylpyridinium, N,N-dimethylmorpholinium, the alkyl quaternary ammonium cation of the 2 mole oligomer of epihalohydrin wherein the alkyl radical is selected from the group of —CH₃, —C₂H₅, —C₃H₇ and —C₄H₉ radicals, and cations of the formula wherein R is independently —CH₃, —C₂H₅, —C₃H₇ or —C₄H₉.

The quaternary ammonium cation can also be selected from cations of the general formulas:

wherein
A represents the group

B represents the group

C represents the group

D represents the group and
E represents and further wherein:

$R_1$ is selected from the groups,
—CH$_2$COOH, —CH$_2$CH$_2$OH,
—CH$_2$CH$_2$CH$_2$OH and
—CH$_2$CHOHCH$_3$;

$R_2$ is selected from the groups,
—CH$_2$CH$_2$—, —CH$_2$CHOHCH$_2$—,
—CH$_2$CH$_2$CH$_2$—, —CH$_2$CH$_2$CH$_2$CH$_2$—, and
—CH$_2$CH$_2$OCH$_2$CH$_2$—;

$R_3$ is selected from the groups, and $R_4$ is independently hydrogen and the group —(CH$_2$)$_n$CH$_3$ wherein n has a value in the range of 0 to 5 and at least one of said $R_4$ substituents is said —(CH$_2$)$_n$CH$_3$ group.

The anion of the formation stabilizing compound can be an anion selected from halides, anions derived from organic acids, i.e., carboxylates, or other inorganic, organic or combination anions. The halides which can be utilized include fluoride, chloride, bromide or iodide. As stated above, when it is desirable that the aqueous drilling fluid be substantially free of halides, an organic carboxylate anion can be used, examples of which include:

formate, HCOO$^-$;
acetate, CH$_3$COO$^-$;
hydroxyacetate, HOCH$_2$COO$^-$;
lactate, CH$_3$CHOHCOO$^-$;
citrate, —OOCCH$_2$COH(COO—)CH$_2$COO$^-$; and
benzoate, C$_6$H$_5$COO$^-$.

Inorganic anions such as nitrate, nitrite, sulfate and sulfite can also be utilized. Other inorganic, organic or combination anions can be utilized so long as they are compatible with the various components of the drilling fluid and the subterranean formations to be contacted therewith.

Numerical coefficients are not shown on the above formulas; however, it will be understood by those skilled in the art that to maintain electrical neutrality, sufficient cation portions and/or sufficient anion portions are present to properly balance the equations of the formulas. Thus, for example, a specific quaternary ammonium citrate may have three cation portions and one anion portion, but would be represented herein by the general formula AR$_1$Z where A and R$_1$ are as defined above and Z is one of the anions described above. Also a specific diquaternary ammonium halide may have one cation portion and two anion portions but would be represented herein by the general formula AR$_2$AZ.

Specific examples of compounds which are suitable for use in accordance with the present invention and which are within the scope of the above formulas are:

Tetramethylammonium chloride
Tetramethylammonium acetate
Tetrabutylammonium nitrate
Tetrabutylammonium sulfate
N,N,N-trimethylphenylammonium chloride
N-methylpyridinium chloride
N,N-dimethylmorpholinium chloride
Methyl quaternary ammonium chloride salt of the two mole oligomer of epichlorohydrin
2-Hydroxy-N,N-Bis(2-Hydroxy Ethyl)-N-Methyl Ethanaminium Chloride
N,N,N-Trimethyl Methanaminium Acetate
2-Hydroxy-N,N,N-Trimethyl Ethanaminium Citrate
N-Methyl Alkyl Pyridinium Chloride
2-Hydroxy-N,N,N-Trimethyl Ethanaminium Chloride
2-Hydroxy-N,N,N-Trimethyl-1 Propanaminium Acetate
2-Hydroxy-N,N,N-Trimethyl Ethanaminium Formate
2-Hydroxy-N,N,N-Trimethyl-1 Propanaminium Formate
1-Carboxy-N,N,N-Trimethyl Methanaminium Chloride
1,3-Bis(Trimethanaminium), 2-Propanol Dichloride
2-Hydroxy-N,N,N-Trimethyl Ethanaminium Acetate
1,2-Bis(Trimethanaminium) Ethane Dichloride
2-Hydroxy-N-(2-Hydroxy Ethyl)-N,N-Dimethyl Ethanaminium Chloride The formation stabilizing compound utilized is admixed with the aqueous drilling fluid in an amount effective to substantially stabilize water sensitive formations containing clays and fines whereby damage does not result thereto. Generally, the formation stabilizing compound is admixed with the aqueous drilling fluid in an amount in the range of from about 0.1% to about 1.0% by weight of the water in the drilling fluid.

Preferred formation control compounds for use in accordance with the present invention contain cations selected from the group consisting of cations of the formula wherein R is independently methyl, ethyl, propyl or butyl. A particularly preferred such cation is tetramethylammonium.

Of the various anions which can be utilized, anions selected from the group consisting of halides, formate, acetate, nitrate, nitrite, sulfate and sulfite are preferred. Of the anions, chloride is preferred when its use can be tolerated, and otherwise, nitrate is preferred.

The most preferred quaternary ammonium formation stabilizing compounds for use in accordance with this invention are tetramethylammonium chloride and tetramethylammonium nitrate. When such formation stabilizing compounds are used, they are preferably admixed with an aqueous drilling fluid in an amount in the range of from about 0.1% to about 1.0% by weight of the water in the drilling fluid.

The viscosifying agent included in an aqueous drilling fluid can be a prehydrated clay such as bentonite, attapulgite, sepiolite or the like, or an organic polymer such as polyacrylamide can be utilized. The term "polyacrylamide" is used herein to mean either partially hydrolyzed or nonhydrolyzed polyacrylamide. Generally, the viscosifying agent is included in the aqueous drilling fluid in an amount such that solid weighting material and produced formation cuttings can be suspended therein.

While the viscosifying agent provides some fluid loss control to the drilling fluid, it is usually desirable to admix a selected fluid loss control agent with the drilling fluid. Examples of fluid loss control agents which can be utilized are cellulose derivatives such as carboxymethylcellulose, hydroxyethylcellulose or polyanionic cellulose, organic polymers such as sodium polyacrylate, starches such as pregelatonized corn starch, potato starch and carboxymethyl starch and mixtures of such materials. When a fluid loss control agent is utilized, it is generally admixed with the aqueous drilling fluid in an amount in the range of from about 0.02% to about 3.0% by weight of the water in the drilling fluid.

The pH of the drilling fluid is generally adjusted to provide a pH in the range of from about 5 to about 12, preferably from about 7 to about 10. The pH adjustment is normally accomplished by adding a base such as sodium or potassium hydroxide to the drilling fluid in an appropriate amount.

Drilling fluids also usually include a weighting agent which is suspended in the drilling fluid in an amount sufficient to produce a density in the range of from about 8.5 to about 20 lbs. per gallon. The weighting agent can be comprised of barite, iron oxides such as hematite, galena, calcium carbonate (calcite), siderite or any other solid material which is capable of weighting a drilling fluid.

When an organic polymer viscosifying agent such as polyacrylamide is utilized in what is known in the art as a "clear water" drilling application, a separate fluid loss control additive, pH control additive and the like are not normally utilized.

A preferred drilling fluid of the present invention is comprised of water, a viscosifying agent selected from the group consisting of clays and organic polymers and a formation stabilizing compound selected from tetramethylammonium chloride and tetramethylammonium acetate present in the drilling fluid in an amount in the range of from about 0.1% to about 1.0% by weight of water in the drilling fluid.

The method of this invention for preventing damage to water sensitive formations while drilling into or through such formations and contacting them with a viscosified aqueous drilling fluid comprises adding a formation stabilizing compound to the aqueous drilling fluid of the type described above. The formation stabilizing compound can be admixed with the water used prior to the addition of the viscosifying agent and other components of the drilling fluid thereto, or the formation stabilizing compound can be added to the drilling fluid at any other convenient stage of its preparation. The formation stabilizing compound is included in the drilling fluid in an amount effective to stabilize the formations to be contacted by the drilling fluid, generally within the range of from about 0.1% to about 1.0% by weight of water in the drilling fluid. The presence of the formation stabilizing compound in the drilling fluid stabilizes formations containing clays and fines which swell or otherwise disperse, disintegrate or become disrupted in the presence of aqueous drilling fluids.

The following examples are presented to illustrate the effectiveness of the formation stabilizing compounds in the prevention of substantial permeability reduction upon contact of an aqueous drilling fluid with a clay-containing formation. The examples are not to be considered as limitations upon the scope of the present invention but are presented for illustration only. All quantities, proportions and percentages are by weight and all tests were performed at room temperature unless otherwise indicated.

Example 1

Figure 1:
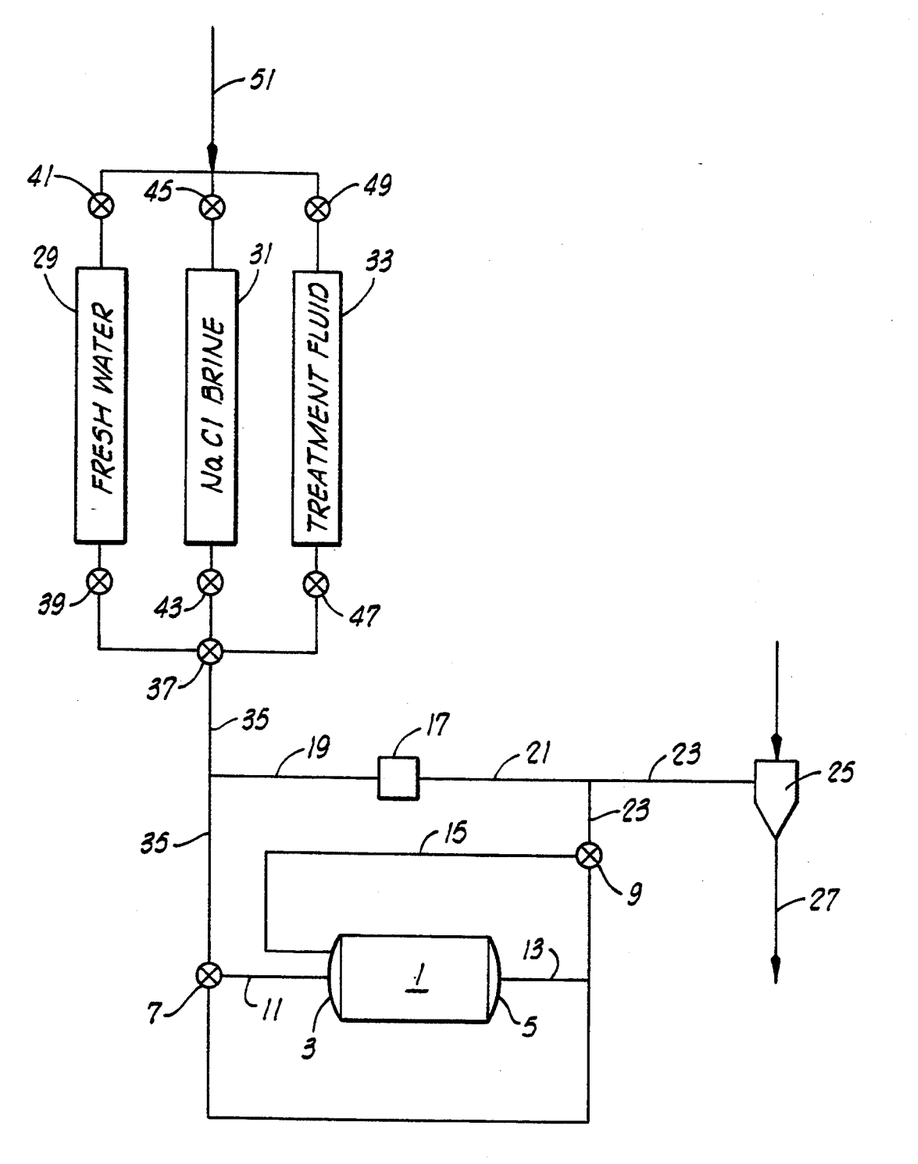
The drawing is a diagrammatic illustration of the test apparatus utilized in Example 1.

Referring now to the drawing, the test equipment utilized in this Example is illustrated. A core sample to be tested is mounted in a Hassler sleeve test cell 1, having one end thereof designated as the formation side 3 and the other end thereof designated as the wellbore side 5. The direction of fluid flowing through cell 1 from side 3 to side 5 is referred to as the production direction, and the direction of fluid flowing through cell 1 from side 5 to side 3 is referred to as the fluid loss direction.

The equipment includes a 3-way, high pressure ball valve 7, and a 3-way, high pressure ball valve 9. Thus, by appropriate manipulation of ball valves 7 and 9 fluids can be directed through cell 1 via lines 11, 13 and 15 in either the production direction or the fluid loss direction.

The pressure difference across cell 1 between formation side 3 and wellbore side 5 is measured by a differential pressure transducer 17 mounted between lines 19 and 21 wherein line 19 exhibits the pressure of fluid entering cell 1 via lines 11 or 13 and line 21 exhibits the pressure of fluid exiting cell 1 via lines 13 or 15.

Transducer 17 is connected to a computer, not shown, that contains and stores permeability data pertaining to the core being tested and fluid volume data pertaining to the volume of fluid passing through the core being tested.

All fluid flowing through the equipment system shown in the drawing exits the system via lines 23, back pressure regulator 25 and line 27.

All fluid entering cell 1 originates from one of three vessels 29, 31 or 33 via lines 35 and selection valve 37. Each of vessels 29, 31 and 33 can be isolated from the system by isolation valves 39 and 41, 43 and 45, and 47 and 49 respectively. By appropriate manipulation of valves 37, 39, 41, 43, 45, 47 and 49 fluid can be caused, as described below, to flow from one of vessels 29, 31 or 33 and into and through cell 1 in either the production direction or the fluid loss direction.

In addition to the above, all fluids entering the system are passed through a 0.5 micron filter (not shown) prior to entering cell 1.

Fluids entering the system must overcome resistance to flow offered by back pressure generated by regulator 25 as well as resistance offered by the core itself in cell 1 and resistance offered by tubing and valves. This total resistance is overcome by applying pressure to vessels 29, 31 and 33 via line 51 which is connected to a constant displacement high pressure pump (not shown). Light mineral oil is moved by the pump into the tops of vessels 29, 31 and 33 to displace therefrom the fluid contained therein and into and through cell 1. In the tests, back pressure regulator 25 maintains a constant pressure of 300 psig in lines 23 on the discharge side of cell 1.

As mentioned above fluid to be passed through cell 1 originates from vessels 29, 31 and 33. Vessel 29 contains deionized water; vessel 31 contains a 5 percent solution of sodium chloride and vessel 33 contains the fluid to be tested, i.e., the "test fluid".

In operation of the test equipment, the initial permeability, $K_1$, of the core maintained in cell 1 is obtained by flowing the sodium chloride solution from vessel 31 through the core in the production direction.

Upon determination of initial permeability, $K_1$, the pump rate is reduced to zero and the equipment valves manipulated to permit fluid flow through the core in cell 1 in the fluid loss direction at which time one pore volume (pv) of treatment fluid from vessel 33 is caused to be passed through cell 1 in the fluid loss direction. Thereafter, the pump rate is again reduced to zero and the equipment valves again manipulated to permit fluid flow through the core in cell 1 in the production direction at which time the sodium chloride solution from vessel 31 is again passed through the core to obtain final permeability, K. Any change between initial permeability, $K_1$, and final permeability, K, is caused by the test fluid. Core damage is indicated where $K_1$ is greater than K. Another indication of permeability change is indicated by the ratio, $K/K_1$, of final permeability to initial permeability. Where the ratio is less than one, permeability has been reduced (i.e., damage); where the ratio is one or more permeability has been preserved or improved (i.e., no damage). The test equipment and procedure thus simulates the invasion of fluid into a formation as the result of fluid loss thereinto from a drilling fluid prior to when such fluid loss is stopped by the build up of filter cake on the walls of the well bore penetrating the formation.

Various test fluids were utilized in accordance with the above test procedure. The test results obtained for each test fluid are provided in terms of the ratio, $K/K_1$, reported as a percent; that is, final core permeability is expressed as a percent of initial core permeability. The test procedure thus quantifies the formation damage that results from the introduction of an aqueous fluid into a subterranean formation, e.g., as the result of fluid loss from an aqueous drilling fluid.

After final permeability, K, is obtained, fresh water from vessel 29 is then passed through cell 1 in the production direction to obtain water permeability, Kw. If the ratio $Kw/K_1$ is less than the ratio $K/K_1$, then the core tested is considered to be water sensitive and it is concluded that the test conducted is a valid test of the effect of the particular treating fluid on a water sensitive sample. In every test reported herein, the water permeability test confirmed that all core samples tested were water sensitive.

Utilizing the test procedure described above with respect to the drawing, aqueous test fluids were passed through Ohio Sandstone Cores to determine the damaging effect of the fluids on the cores. The test fluids consisted of water solutions of the formation stabilizing compounds of this invention present in the fluids in the amount of 0.5 percent formation stabilizing compound by total weight of fluid.

The test results, which are provided in Table I below, include the chemical identity of the formation stabilizing compound, the general structure thereof, the percent additive in the test fluid by weight of fluid and the core damage expressed in terms of final permeability as a percent of initial permeability. In the Table and as used herein, Z indicates an anion selected from halides, nitrates, nitrites, sulfates, sulfites and carboxylates; and Y indicates an anion selected from carboxylates only.

TABLE I

| | OHIO SANDSTONE CORE | | |
|---|---|---|---|
| | Chemical Compound | | |
| Name of Formation Stabilizing Compound | General Structure | % Solution | $K/K_1$, % |
| None (Deionized Water) | — | — | 72 |
| None (Potassium Chloride Solution) | — | 0.1 | 74 |
| Tetramethylammonium Chloride | $CH_3-\underset{\underset{CH_3}{\mid}}{\overset{\overset{CH_3}{\mid}}{N^+}}-CH_3\ Z^-$ | 0.1 | 109 |
| Tetrabutylammonium Chloride | $C_4H_9-\underset{\underset{C_4H_9}{\mid}}{\overset{\overset{C_4H_9}{\mid}}{N^+}}-C_4H_9\ Z^-$ | 0.5 | 93 |
| N,N,N-Trimethylphenyl-ammonium Iodide | $CH_3-\underset{\underset{C_6H_5}{\mid}}{\overset{\overset{CH_3}{\mid}}{N^+}}-CH_3\ Z^-$ | 0.5 | 80 |
| N-Methylpyridinium Iodide | (N-methylpyridinium structure with $CH_3$ on $N^+$, $Z^-$) | 0.5 | 100 |
| N,N-Dimethylmor-pholinium Iodide | (morpholinium structure with two $CH_3$ groups on $N^+$, $Z^-$, O in ring) | 0.5 | 96 |

TABLE I-continued

OHIO SANDSTONE CORE

| Name of Formation Stabilizing Compound | Chemical Compound General Structure | % Solution | $K/K_1$, % |
|---|---|---|---|
| Methyl Quaternary Ammonium Salt of 2 Mole Oligomer of Epichlorohydrin | H—O—CH—CH$_2$—O—CH$_2$—CH—O—H, with CH$_2$—N$^+$(CH$_3$)$_3$ groups on each CH | 0.5 | 94 |
| 2-Hydroxy-N,N-Bis (2-Hydroxy Ethyl)- N-Methyl Ethanaminium Chloride | R$_1$ D R$_1$ Z, R$_1$ | 0.5 | 87.8 |
| Tetramethylammonium Acetate | CH$_3$—N$^+$(CH$_3$)$_3$ Y$^-$ | 0.5 | 89.0 |
| 2-Hydroxy-N,N,N-Trimethyl Ethanaminium Citrate | AR$_1$Z | 0.5 | 90.5 |
| N-Methyl Alkyl Pyridinium Chloride | CR$_3$Z | 0.5 | 92.6 |
| 2-Hydroxy-N,N,N-Trimethyl Ethanaminium Chloride | AR$_1$Z | 0.5 | 97.2 |
| 2-Hydroxy-N,N,N-Trimethyl-1 Propanaminium Chloride | AR$_1$Z | 0.5 | 97.5 |
| 1-Carboxy-N,N,N-Trimethyl Methanaminium Chloride | AR$_1$Z | 0.5 | 97.5 |
| 1,3-Bis(Trimethanaminium), 2-Propanol Dichloride | AR$_2$A Z | 0.5 | 98.3 |
| 2-Hydroxy-N,N,N-Trimethyl Ethanaminium Acetate | AR$_1$Z | 0.5 | 99.5 |
| 1,2-Bis(Trimethanaminium) Ethane Dichloride | AR$_2$A Z | 0.5 | 100.0 |
| 2-Hydroxy-N-(2-Hydroxy Ethyl)-N,N-Dimethyl Ethanaminium Chloride | R$_1$BR$_1$ Z | 0.5 | 100.0 |

The results clearly illustrate the substantially nondamaging effect on a formation core sample upon exposure thereof to an aqueous fluid containing the formation stabilizing compounds of this invention.

EXAMPLE 2

Two test aqueous drilling fluids were prepared, the first being comprised of water, bentonite clay viscosifying agent, fluid loss components, a pH adjustment additive, a pH stabilizer and barite weighting material. The second aqueous drilling fluid, known as a "solids free" formulation, was comprised of water and polyacrylamide viscosifying agent only. The components and quantities of the components in the two aqueous drilling fluids are given in Table II below.

TABLE II

| Component | Drilling Fluid No. 1 | Drilling Fluid No. 2 |
|---|---|---|
| Fresh Water | 40.5 gal/bbl | 41.5 gal/bbl |
| Polyacrylamide[1] | — | 0.1 lb/bbl |
| Bentonite | 8 lb/bbl | — |
| Polyanionic cellulose[2] | 0.2 lb/bbl | — |
| Sodium Polyacrylate[3] | 0.3 lb/bbl | — |
| Modified starch[4] | 0.3 lb/bbl | — |
| NaOH Solution[5] | 0.05 lb/bbl | — |
| Barite | 40 lb/bbl | — |

[1]Commercially available from M-I Drilling Fluids, Inc. of Houston, Texas, under the trade name Poly Plus ™.
[2]Commercially available from M-I Drilling Fluids, Inc. of Houston, Texas, under the trade name Poly PAC ™.
[3]Commercially available from M-I Drilling Fluids, Inc. of Houston, Texas, under the trade name SP-101 ™.
[4]Commercially available from M-I Drilling Fluids, Inc. of Houston, Texas, under the trade name Thermpac ™.
[5]50% by weight aqueous solution.

Tetramethylammonium chloride was added to Drilling Fluid No. 1 in an amount of 0.5% by weight of water in the drilling fluid, and to Drilling Fluid No. 2 in an amount of 0.25% by weight of water. The drilling fluids were thoroughly mixed and allowed to stand for thirty minutes. Each test drilling fluid was then filtered through a 0.5 micrometer filter, and the filtrates were separately collected. The filtrates were analyzed by cation chromatography to determine the concentrations of tetramethylammonium chloride therein, and the filtrates were then used in capillary suction time tests using a water sensitive shale sample to determine their effectiveness in stabilizing the shale. Equivalent tests were run for comparison purposes utilizing 2% by weight potassium chloride in fresh water, a 0.25% by weight solution of tetramethylammonium chloride in fresh water and fresh water alone.

The capillary suction time test procedure is described in the article by R. V. Lauzon, "Colloid Science Resolves Shale Formation Damage Problems", *Oil and Gas Journal*, Jul. 30, 1984, pages 175–179. The test measures the time required for a liquid to travel a calibrated distance in a standard porous paper. The measurement is made by placing 5–7 ml of a slurry of water sensitive shale in the test fluid into a cylinder which is resting upon a standard porous paper. Electrodes are located 0.5 and 1.0 cm from the edge of the cylinder and connected to a timer which measures the time required for the filtrate to travel from the electrode closest to the cylinder to the farthest electrode. The time interval measured depends on the amount of free water in the slurry and the permeability of the filter cake deposited. The more flocculated (less dispersed) the slurry, the more permeable the filter cake and the shorter the time interval. That is, the lower the capillary suction time, the more stable is the shale in contact with the fluid tested.

The filtrate from Drilling Fluid No. 1 contained 0.185% by weight tetramethylammonium chloride and the filtrate from the Drilling Fluid No. 2 contained 0.25% by weight tetramethylammonium chloride.

The results of the capillary suction time tests run on the filtrates of the test drilling fluids, fresh water, 2% by weight potassium chloride in fresh water and 0.3% by weight tetramethylammonium chloride in fresh water are set forth in Table III below.

TABLE III

| Test Fluid | Capillary Suction Time, seconds |
|---|---|
| Fresh Water | 102.5 |
| 2% by weight KCl in Fresh Water | 25.9 |
| 0.3% Tetramethylammonium chloride in Fresh Water | 24.5 |
| Drilling Fluid No. 1 Filtrate | 25.2 |
| Drilling Fluid No. 2 Filtrate | 21.9 |

From the test results set forth in Table III, it can be seen that the drilling fluids of the present invention effectively stabilized the water sensitive shale utilized in the tests.

Thus, the present invention is well adapted to carry out the objects and attain the ends and advantages mentioned as well as those which are inherent therein. While numerous changes in the drilling fluids and methods of the invention may be able to be made by those skilled in the art, such changes are encompassed within the spirit of the invention as defined by the appended claims.

What is claimed is:

1. A well drilling fluid containing water, no oil, at least one viscosifying agent and a formation stabilizing compound containing a cation selected from the group consisting of N,N,N-trimethylphenylammonium, N-methylpyridinium, N,N-dimethylmorpholinium, the alkyl quaternary ammonium cation of the 2 mole oligomer of epihalohydrin wherein the alkyl radical is selected from —CH$_3$, —C$_2$H$_5$, —C$_3$H$_7$ and —C$_4$H$_9$ radicals, and cations of the formula wherein R is independently —CH$_3$, —C$_2$H$_5$, —C$_3$H$_7$ or —C$_4$H$_9$, and cations of the general formulas:

wherein
A represents the group

B represents the group

C represents the group

D represents the group

E represents and further wherein:
R$_1$ is selected from the groups,
—CH$_2$COOH, —CH$_2$CH$_2$OH,
—CH$_2$CH$_2$CH$_2$OH and
—CH$_2$CHOHCH$_3$;
R$_2$ is selected from the groups,
—CH$_2$CH$_2$—, —CH$_2$CHOHCH$_2$—,
—CH$_2$CH$_2$CH$_2$—, —CH$_2$CH$_2$CH$_2$CH$_2$—, and
—CH$_2$CH$_2$OCH$_2$CH$_2$—;
R$_3$ is selected from the groups, and
R$_4$ is independently hydrogen and the group —(CH$_2$)$_n$CH$_3$ wherein n has a value in the range of 0 to 5 and at least one of said R$_4$ substituents is said —(CH$_2$)$_n$CH$_3$ group;
and an anion selected from the group consisting of inorganic anions, organic anions and mixtures thereof which do not react with said drilling fluid.

2. The drilling fluid of claim 1 wherein said formation stabilizing compound is present therein in an amount in the range of from about 0.1% to about 1.0% by weight of water in said drilling fluid.

3. The drilling fluid of claim 2 wherein the cation of said formation stabilizing compound is selected from the group consisting of cations of the formula wherein R is independently methyl, ethyl, propyl or butyl.

4. The drilling fluid of claim 3 wherein the anion of said formation stabilizing compound is selected from the group consisting of halides, formate, acetate, nitrate, nitrite, sulfate and sulfite.

5. The drilling fluid of claim 2 wherein said formation stabilizing compound is selected from tetramethylammonium chloride and tetramethylammonium nitrate.

6. The drilling fluid of claim 1 wherein said viscosifying agent is selected from the group consisting of clays and organic polymers.

7. The drilling fluid of claim 6 wherein said viscosifying agent is a clay selected from the group consisting of bentonite, attapulgite and sepiolite.

8. The drilling fluid of claim 6 wherein said viscosifying agent is polyacrylamide.

9. The drilling fluid of claim 6 which is further characterized to include a fluid loss control agent selected from the group consisting of organic polymers, starches and mixtures thereof.

10. A well drilling fluid containing water, no oil, a viscosifying agent selected from the group consisting of clays and organic polymers and a formation stabilizing compound containing a cation selected from the group consisting of cations of the formula wherein R is independently methyl, ethyl, propyl, or butyl, and an anion selected from the group consisting of halides, formate, acetate, nitrate, nitrite, sulfate, and sulfite.

11. The drilling fluid of claim 10 wherein said formation stabilizing compound is present therein in an amount in the range of from about 0.1% to about 1.0% by weight of water in said drilling fluid.

12. The drilling fluid of claim 11 wherein said formation stabilizing compound is selected from tetramethylammonium chloride and tetramethylammonium nitrate.

13. The drilling fluid of claim 12 wherein said viscosifying agent is bentonite.

14. The drilling fluid of claim 12 wherein said viscosifying agent is polyacrylamide.

15. A method of preventing damage to water sensitive formations while drilling into or through such formations and contacting them with a viscosified aqueous drilling fluid containing no oil comprising adding a formation stabilizing compound to said aqueous drilling fluid, said formation stabilizing compound containing a cation selected from the group consisting of N,N,N-trimethylphenylammonium, N-methylpyridinium, N,N-dimethylmorpholinium, the alkyl quaternary ammonium cation of the 2 mole oligomer of epihalohydrin wherein the alkyl radical is selected from —CH$_3$, —C$_2$H$_5$, —C$_3$H$_7$ and —C$_4$H$_9$ radicals, and cations of the formula wherein R is independently —CH$_3$, —C$_2$H$_5$, —C$_3$H$_7$ or —C$_4$H$_9$, and cations of the general formulas:

wherein
A represents the group

B represents the group

C represents the group

D represents the group and
E represents and further wherein:
R$_1$ is selected from the groups,
—CH$_2$COOH, —CH$_2$CH$_2$OH,
—CH$_2$CH$_2$CH$_2$OH and
—CH$_2$CHOHCH$_3$;
R$_2$ is selected from the groups,
—CH$_2$CH$_2$, —CH$_2$CHOHCH$_2$—,
—CH$_2$CH$_2$CH$_2$—, —CH$_2$CH$_2$CH$_2$CH$_2$—, and
—CH$_2$CH$_2$OCH$_2$CH$_2$—;
R$_3$ is selected from the groups, and

R₄ is independently hydrogen and the group —(CH$_2$)$_n$CH$_3$ wherein n has a value in the range of 0 to 5 and at least one of said R₄ substituents is said —(CH$_2$)$_n$CH$_3$ group;

and an anion selected from the group consisting of inorganic anions, organic anions and mixtures thereof which do not react with said drilling fluid or the formations contacted thereby.

16. The method of claim 15 wherein said formation stabilizing compound is present in said drilling fluid in an amount in the range of from about 0.1% to about 1.0% by weight of water therein.

17. The method of claim 15 wherein the cation of said formation stabilizing compound is selected from the group consisting of cations of the formula wherein R is independently methyl, ethyl, propyl or butyl.

18. The method of claim 15 wherein the anion of said formation stabilizing compound is selected from the group consisting of halides, formate acetate, nitrate, nitrite, sulfate and sulfite.

19. The method of claim 17 wherein said formation stabilizing compound is selected from tetramethylammonium chloride and tetramethylammonium nitrate.

* * * * *